(12) United States Patent
Lee et al.

(10) Patent No.: US 12,135,772 B2
(45) Date of Patent: Nov. 5, 2024

(54) BIOMETRIC AUTHENTICATION SYSTEM AND ELECTRONIC DEVICE FOR SAME

(71) Applicant: SAMSUNG ELECTRONICS CO., LTD., Suwon-si (KR)

(72) Inventors: Seungeun Lee, Suwon-si (KR); Minseok Kang, Suwon-si (KR); Nanhee Kim, Suwon-si (KR); Seungnyun Kim, Suwon-si (KR); Chakyum Kim, Suwon-si (KR); Hyewon Seo, Suwon-si (KR); Jonghun Won, Suwon-si (KR); Byengseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 17/961,324

(22) Filed: Oct. 6, 2022

(65) Prior Publication Data
US 2023/0026684 A1  Jan. 26, 2023

Related U.S. Application Data

(63) Continuation of application No. PCT/KR2021/003031, filed on Mar. 11, 2021.

(30) Foreign Application Priority Data

Apr. 8, 2020 (KR) ........................ 10-2020-0042479

(51) Int. Cl.
*G06F 21/32* (2013.01)

(52) U.S. Cl.
CPC .................................... *G06F 21/32* (2013.01)

(58) Field of Classification Search
CPC ...... G06F 21/32; G06F 1/1616; G06F 1/1677; G06F 1/1686; H04L 63/0861; G06V 40/172; G06V 40/16
See application file for complete search history.

(56) References Cited

U.S. PATENT DOCUMENTS

| 8,385,987 B2 | 2/2013 | Kim et al. |
| 9,373,307 B2 | 6/2016 | Kim et al. |

(Continued)

FOREIGN PATENT DOCUMENTS

| KR | 10-1615379 B1 | 4/2016 |
| KR | 10-2016-0117381 A | 10/2016 |

OTHER PUBLICATIONS

Communication dated Jul. 6, 2023 issued by the European Patent Office in European Application No. 21783826.7.

(Continued)

*Primary Examiner* — El Hadji M Sall
(74) *Attorney, Agent, or Firm* — Sughrue Mion, PLLC

(57) ABSTRACT

A foldable electronic device includes a first housing and a second housing that are foldable with respect to each other; at least one sensor; a display; a camera configured to operate in a first mode associated with user recognition, and a second mode associated with user authentication; a memory storing instructions; at least one processor configured to execute the instructions to: control the display to display notification information about an event corresponding to the foldable electronic device; based on a folding state of the foldable electronic device detected using the at least one sensor satisfying a predetermined condition, obtain at least one first image using the camera operating in the first mode; identify whether a face is present in the at least one first image; based on identifying that the face is present in the at least one first image, obtain at least one second image using the camera operating in the second mode; perform face recognition-based biometric authentication using at least part of the at least one second image; and based on the biometric authentication being successful, control the display to display content corresponding to the event.

15 Claims, 16 Drawing Sheets

(56) References Cited

U.S. PATENT DOCUMENTS

| | | | |
|---|---|---|---|
| 9,721,107 B2 | 8/2017 | Han et al. | |
| 10,263,982 B2 | 4/2019 | Kim | |
| 10,289,852 B2 | 5/2019 | Han et al. | |
| 10,552,617 B2 | 2/2020 | Han et al. | |
| 10,635,136 B2 | 4/2020 | La et al. | |
| 10,673,848 B2 | 6/2020 | Kim | |
| 10,957,136 B1 * | 3/2021 | Kocher | G07C 9/23 |
| 11,144,095 B2 | 10/2021 | La et al. | |
| 2012/0200601 A1 * | 8/2012 | Osterhout | G02B 27/017 |
| | | | 345/633 |
| 2013/0225128 A1 * | 8/2013 | Gomar | H04L 63/0861 |
| | | | 455/411 |
| 2016/0187994 A1 | 6/2016 | La et al. | |
| 2016/0246470 A1 | 8/2016 | Doi et al. | |
| 2016/0381014 A1 | 12/2016 | Kim | |
| 2017/0085563 A1 * | 3/2017 | Royyuru | G06Q 20/12 |
| 2017/0357790 A1 * | 12/2017 | Robinson | H04W 12/02 |
| 2018/0329672 A1 | 11/2018 | Sadak et al. | |
| 2018/0367656 A1 | 12/2018 | Kim et al. | |
| 2020/0076933 A1 | 3/2020 | Xiao | |
| 2020/0327165 A1 * | 10/2020 | Evseroff | H04W 4/022 |

OTHER PUBLICATIONS

Office Action issued Jul. 15, 2024 by the Korean Patent Office for KR Patent Application No. 10-2020-0042479.

* cited by examiner

BIOMETRIC AUTHENTICATION SYSTEM AND ELECTRONIC DEVICE FOR SAME

CROSS-REFERENCE TO RELATED APPLICATIONS

This application is a bypass continuation application of PCT International Application No. PCT/KR2021/003031, which was filed on Mar. 11, 2021, in the Korean Intellectual Property Office, and which claims priority to Korean Patent Application No. 10-2020-0042479, filed on Apr. 8, 2020, in the Korean Intellectual Property Office, the disclosures of which are incorporated by reference herein in their entirety.

BACKGROUND

1. Field

The disclosure relates to a method for performing biometric authentication and an electronic device therefor.

2. Description of Related Art

While the importance of security increases with an increase in digital devices, various authentication methods such as biometric authentication are used for the security of user information. The biometric authentication refers to an authentication method that extracts biometric information, which is specific to a person, such as fingerprints, an iris, a sweat gland structure, a face, and/or a blood vessel, and authenticates a user using the extracted biometric information. Biometric authentication may be used for various purposes in electronic devices. For example, biometric authentication may be applied to various fields such as unlocking of a home screen for the use of an electronic device, and user authentication upon making an electronic commerce payment.

In addition, technologies for increasing a display surface of an electronic device are being developed. The form of the electronic device may be changed to improve the portability and display size of a mobile device. For example, a part of the electronic device may be folded or extended.

SUMMARY

As types of electronic devices are diversified, there is a need for a means for conveniently providing services. For example, a user may employ a foldable electronic device in a half-folded state (e.g., a table display mode). The user may watch content using the electronic device without gripping the electronic device by placing a part of the electronic device on a flat surface such as a desk. When the electronic device receives an event in the half-folded state, the user may perform biometric authentication to identify the content of the event. To perform the biometric authentication, the user may grip the electronic device in the table display mode by hand.

To perform biometric authentication without holding the electronic device, the electronic device may monitor the user's biometric information. For example, the electronic device may determine whether the user's biometric information is detected using a camera. The electronic device may monitor biometric information by activating the camera and obtaining images using the camera. For example, the electronic device may determine whether a specific shape is present in the obtained image. In this process, the power consumption of the electronic device may increase due to the activation of the camera.

According to an aspect of the disclosure, a foldable electronic device includes: a first housing and a second housing that are foldable with respect to each other; at least one sensor; a display; a camera configured to operate in a first mode associated with user recognition, and a second mode associated with user authentication; a memory storing instructions; at least one processor configured to execute the instructions to: control the display to display notification information about an event corresponding to the foldable electronic device; based on a folding state of the foldable electronic device detected using the at least one sensor satisfying a predetermined condition, obtain at least one first image using the camera operating in the first mode; identify whether a face is present in the at least one first image; based on identifying that the face is present in the at least one first image, obtain at least one second image using the camera operating in the second mode; perform face recognition-based biometric authentication using at least part of the at least one second image; and based on the biometric authentication being successful, control the display to display content corresponding to the event.

The processor may be further configured to execute the instructions to, based on an operating time of the camera exceeding a predetermined time in the first mode, terminate an operation of the camera and deactivate the display.

The processor may be further configured to execute the instructions to, based on a plurality of faces being present in the at least one first image, control the display to continuously display the notification information about the event without performing the biometric authentication.

The processor may be further configured to execute the instructions to: extract a location of a face of a user associated with the foldable electronic device from among the plurality of faces included in the at least one first image; and control the display to display the notification information about the event in a region corresponding to the location.

The processor may be further configured to execute the instructions to, based on the biometric authentication being not successful, display a user interface which provides a guide for the biometric authentication on the display.

The processor may be further configured to execute the instructions to: control the display to display the user interface; and perform the biometric authentication again based on detecting at least one from among a face composition change of a user using the at least one sensor, or a device movement.

The processor may be further configured to execute the instructions to perform the biometric authentication by reading out only a partial region of the at least one second image.

The predetermined condition may include a first predetermined condition, and the processor may be further configured to execute the instructions to select a face recognition algorithm for performing the biometric authentication based on whether the folding state of the foldable electronic device detected using the at least one sensor satisfies a second predetermined condition.

The processor may be further configured to execute the instructions to, based on identifying that the face is present in the at least one first image, control the display to display at least part of the content corresponding to the event.

The processor may be further configured to execute the instructions to, based on the biometric authentication being successful, control the display to display additional content, from among the content corresponding to the event, in addition to the at least part of the content.

A power consumption corresponding to the second mode may be higher than a power consumption corresponding to the first mode.

According to an aspect of the disclosure, a method of providing a notification function using a foldable electronic device, includes: displaying notification information about an event corresponding to the foldable electronic device on a display of the foldable electronic device; determining whether a folding state of the foldable electronic device detected using at least one sensor satisfies a predetermined condition; based on the predetermined condition being satisfied, obtaining at least one first image using a camera of the foldable electronic device in a first mode associated with user recognition; identifying whether a face is present in the at least one first image; based on identifying that the face is present in the at least one first image, obtaining at least one second image using the camera in a second mode corresponding to user authentication; performing face recognition-based biometric authentication using at least part of the at least one second image; and based on the biometric authentication being successful, displaying content corresponding to the event on the display.

The obtaining the at least one first image may include, based on n an operating time of the camera exceeding a predetermined time in the first mode, terminating an operation of the camera and deactivating the display.

The identifying whether the face is present in the at least one first image may include, based on identifying that a plurality of faces are present in the at least one first image, continuously displaying the notification information about the event on the display without performing the biometric authentication.

The identifying whether the face is present in the at least one first image further include: extracting a location of a face of a user associated with the foldable electronic device, from among the plurality of faces included in the at least one first image; and displaying the notification information about the event in a region corresponding to the location on the display.

Advantageous Effects

Provided is an electronic device which may perform a biometric authentication function optimized for a user in response to a shape change.

Also provided is electronic device which may perform an efficient biometric authentication function based on a folding angle, information based on an image obtained through a camera.

Also provided is an electronic device which may allow pixels to be selectively used in performing the biometric authentication function, thereby reducing power consumption and effectively performing data processing or calculation of a processor.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein may be variously made without departing from the scope and spirit of the disclosure.

Figure 1:
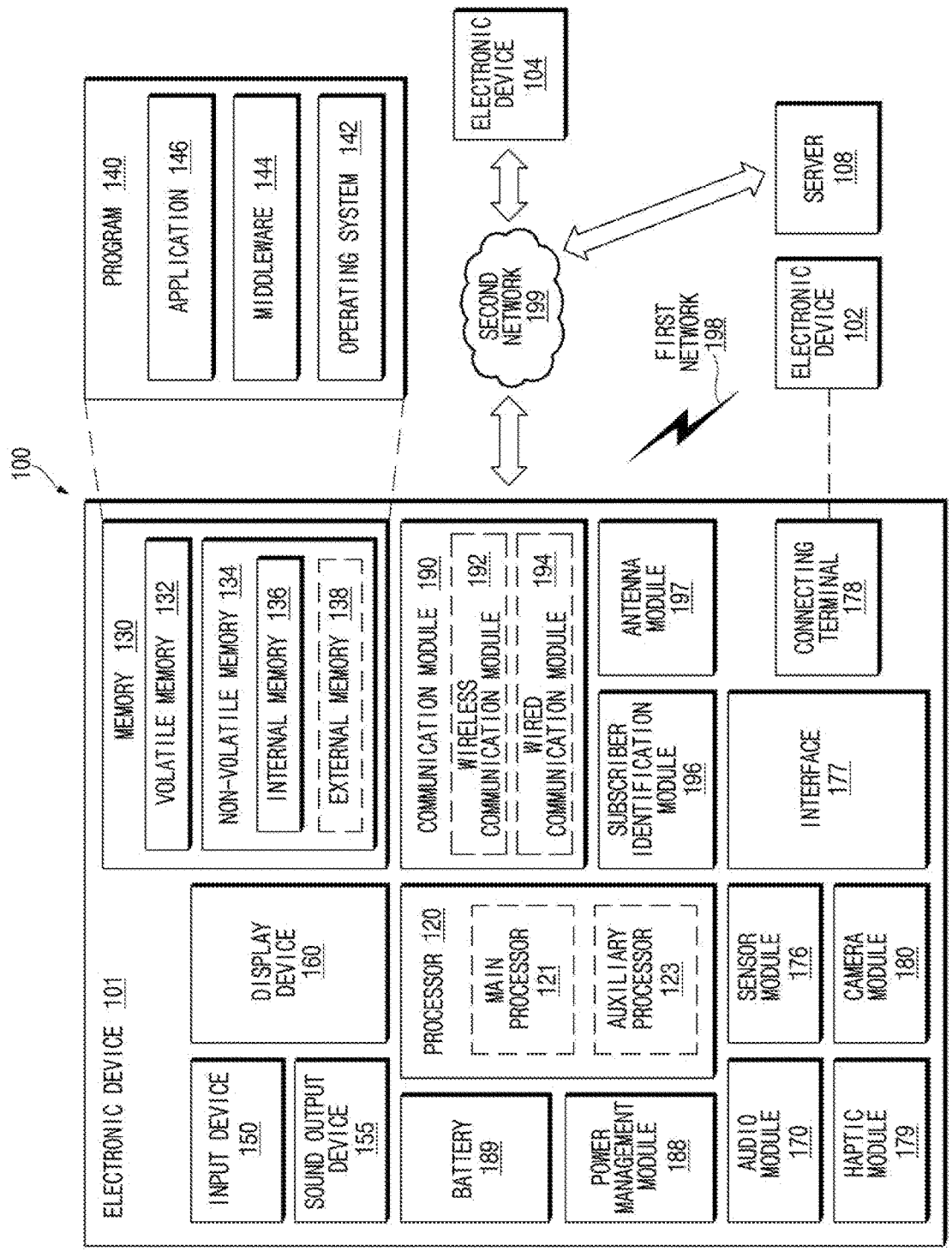
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
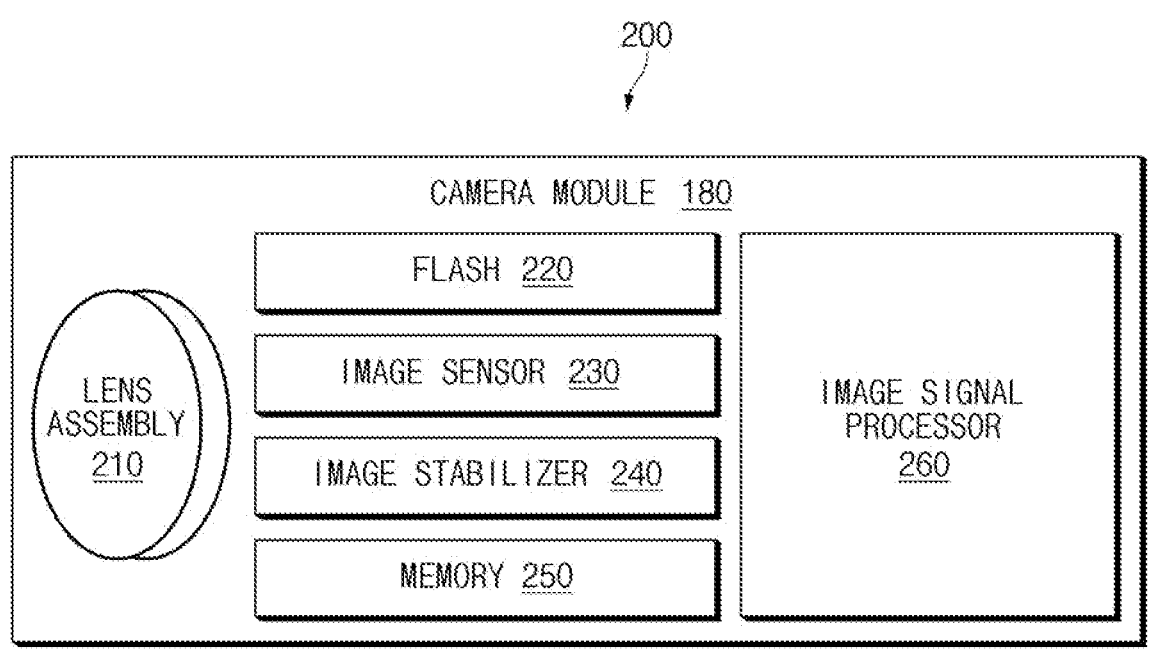
FIG. 2 is a block diagram illustrating a camera module according to an embodiment.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
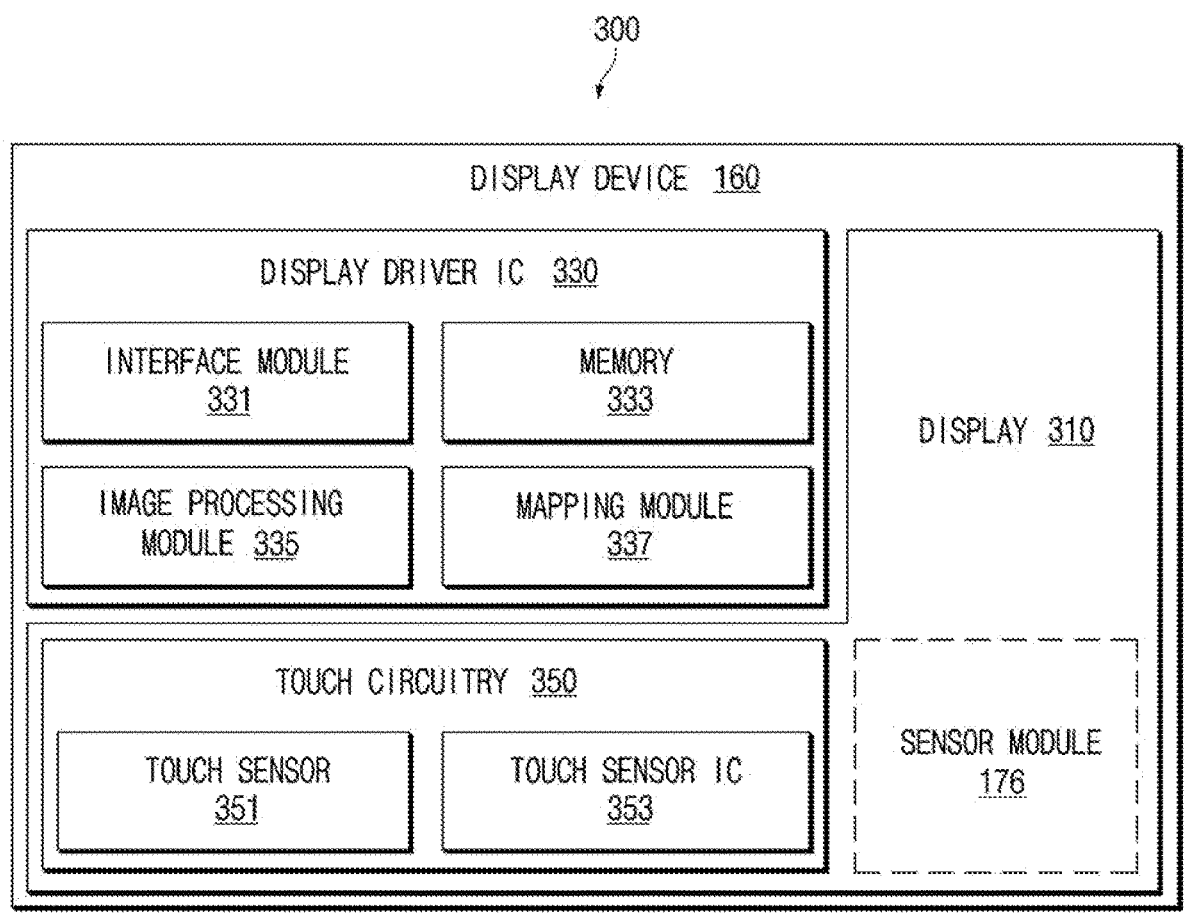
FIG. 3 is a block diagram of a display device, according to an embodiment.

FIG. 3 is a block diagram 300 illustrating the display device 160 according to various embodiments. Referring to FIG. 3, the display device 160 may include a display 310 and a display driver integrated circuit (DDI) 330 to control the display 310. The DDI 330 may include an interface module 331, memory 333 (e.g., buffer memory), an image processing module 335, or a mapping module 337. The DDI 330 may receive image information that contains image data or an image control signal corresponding to a command to control the image data from another component of the electronic device 101 via the interface module 331. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 330 may communicate, for example, with touch circuitry 150 or the sensor module 176 via the interface module 331. The DDI 330 may also store at least part of the received image information in the memory 333, for example, on a frame by frame basis.

The image processing module 335 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 310.

The mapping module 337 may generate a voltage value or a current value corresponding to the image data pre-processed or post-processed by the image processing module 335. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 310 may be driven, for example, based at least in part on the voltage value or the current value such that visual information (e.g., a text, an image, or an icon) corresponding to the image data may be displayed via the display 310.

According to an embodiment, the display device 160 may further include the touch circuitry 350. The touch circuitry 350 may include a touch sensor 351 and a touch sensor IC 353 to control the touch sensor 351. The touch sensor IC 353 may control the touch sensor 351 to sense a touch input or a hovering input with respect to a certain position on the display 310. To achieve this, for example, the touch sensor 351 may detect (e.g., measure) a change in a signal (e.g., a voltage, a quantity of light, a resistance, or a quantity of one or more electric charges) corresponding to the certain position on the display 310. The touch circuitry 350 may provide input information (e.g., a position, an area, a pressure, or a time) indicative of the touch input or the hovering input detected via the touch sensor 351 to the processor 120. According to an embodiment, at least part (e.g., the touch sensor IC 353) of the touch circuitry 350 may be formed as part of the display 310 or the DDI 330, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 310, the DDI 330, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 310. As another example, when the sensor module 176 embedded in the display device 160 includes a pressure sensor, the pressure sensor may obtain pressure information corresponding to a touch input received via a partial or whole area of the display 310. According to an embodiment, the touch sensor 351 or the sensor module 176 may be disposed between pixels in a pixel layer of the display 310, or over or under the pixel layer.

Figure 4:
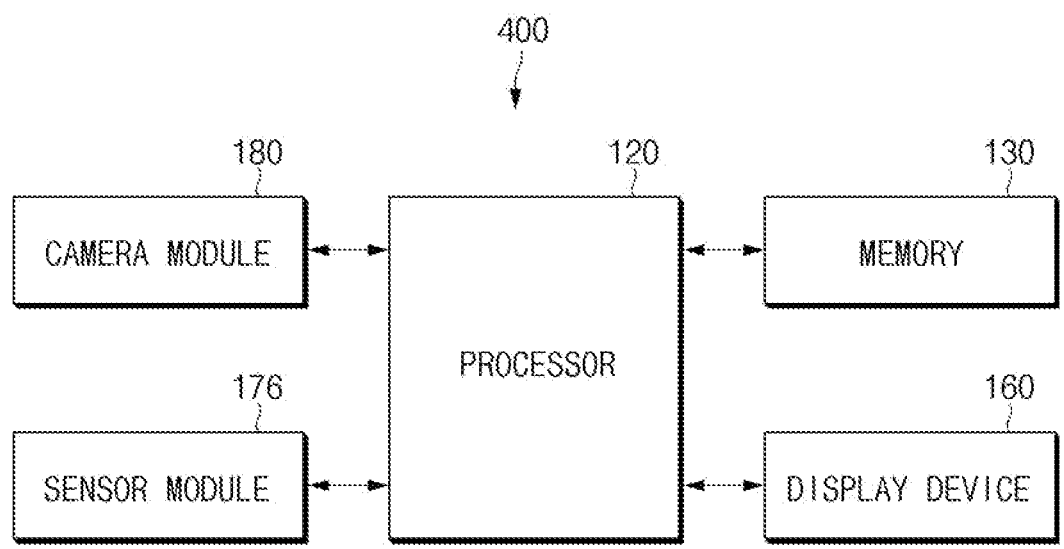
FIG. 4 illustrates a block diagram of an electronic device, according to an embodiment.

FIG. 4 illustrates a block diagram 400 of an electronic device, according to various embodiments.

Referring to FIG. 4, an electronic device (e.g., the electronic device 101 of FIG. 1) may include a processor 120, a memory 130, a display device 160, a sensor module 176, and/or a camera module 180. Unless otherwise described, descriptions of configurations having the same identification number as FIG. 1 may be referred to by the descriptions given with reference to FIG. 1.

The processor 120 may be operatively connected with other components (e.g., the memory 130, the display device 160, the sensor module 410, and/or the camera module 180) within the electronic device 101. The processor 120 may control components of an electronic device. For example, the processor 120 may control the components of the electronic device 101 depending on one or more instructions stored in the memory 130.

The memory 130 may store an operating history of the electronic device 101 output to the display device 160. When the electronic device 101 has the plurality of display devices 160, the memory 130 may store the operating history of the electronic device 101 output to each of the display devices 160 For example, the operating history may include a region of the user interface including different applications respectively executed in the display devices 160 and/or information about the applications.

The display device 160 may output information processed by the electronic device 101. For example, the display device 160 may output a user interface or graphic user interface (GUI) related to a biometric authentication function using the camera module 180. Moreover, the display device 160 may output a notification object including details related to an event received by the electronic device 101. The display device 160 may include various types of displays (e.g., display 310 of FIG. 3). The display 310 may be at least one of a flexible display, a three-dimensional (3D) display, and a foldable display. Moreover, the electronic device 101 may include the plurality of displays 310. For example, the processor 120 may split an output region into a plurality of regions and may perform a split screen mode that outputs different content to each region. At this time, the electronic device 101 may operate in the split screen mode only while it is folded at a specified angle. In the split screen mode, the display 310 may be split into a plurality of display regions. For example, the display 310 may be divided into a first display region and a second display region with respect to a folding part (e.g., a hinge part). For example, the division between the first display region and the second display region may be a logical division of the display region. For example, the display 310 may output the third display region obtained by additionally splitting the display region. The third display region may be a region formed with respect to the folding part. The third display region may be a region formed to logically distinguish between the first display region and the second display region. In embodiments, the above-described division of display regions is not limited to logical division. The first display region and the second display region may mean regions that are physically divided. For example, the first display region and the second display region may mean one region of a separate display device included in one electronic device. The number of split regions, each size, resolution, and/or whether content capable of being output is restricted is not limited to the above-described example. For example, the number of split regions, each size, resolution, and/or whether content capable of being output is restricted may be changed depending on a user's intent. For example, the processor 120 may identify information related to content output from each of the first display region, the second display region, and/or the third display and may store the information in the memory 130.

The camera module 180 may include a plurality of cameras. According to an embodiment, the camera module 180 may be positioned on one side (e.g., a front and/or rear) of the electronic device 101, and one surface of the electronic device may include a surface the same as, or different from, a surface on which the display device 160 is provided. For example, the plurality of cameras may be configured to obtain images of different resolutions, respectively. Each of the plurality of cameras may include at least one sensor. For example, some of the sensors may be image sensors that determine whether a user's face is present in an image captured through a lens, when the electronic device 101 performs biometric authentication.

The sensor module 176 may include at least one sensor (e.g., a hall IC sensor, a digital hall IC sensor, an acceleration sensor, a gyro sensor, and/or a 6-axis sensor). The electronic device 101 may identify the type of the electronic device 101 based on information obtained using the sensor module 176 (e.g., a folding angle of the electronic device 101). For example, the sensor module 176 may include a sensor for recognizing the folding angle of the electronic device. For example, the sensor module 176 may recognize information including the folding angle by detecting a shape change (e.g., folding/unfolding) of the electronic device 101, may identify the current shape of the electronic device 101 based on the folding angle, and may deliver a signal including the information about the shape to the processor 120. The processor 120 may recognize a folding/unfolding shape and/or a folding angle of the electronic device 101 based on the signal received from the sensor module 176.

According to an embodiment, the processor 120 may determine whether the folding angle of the electronic device 101 is within a specified range (e.g., about 90 to 130 degrees), based on information including the folding angle obtained using the sensor module 176. A state where the electronic device 101 is folded within the specified range may be defined as a half-folded state. The processor 120 may deliver information indicating that the electronic device 101 is in a half-folded state, to an application, and the application may provide a user interface optimized with reference to the information. For example, in the half-folded state, the processor 120 may allow the display device 160 to split a screen and to output different content in a plurality of regions. When the electronic device 101 is in a half-folded state, a user may employ the electronic device 101 while placing the electronic device 101 on a table, and this may be defined as a table mode. Table 1 shows examples of an operating state according to a folding angle of the electronic device 101. For example, when the folding angle of the electronic device is between 0° and 90°, or between 130° and 180°, the electronic device 101 may not operate in the half-folded state, as indicated by the X in Table 1. As another example, when the folding angle of the electronic device is between 90° and 130°, the electronic device 101 may operate in the half-folded state, as indicated by the O in Table 1. In embodiments, when the when the folding angle of the electronic device is between 0° and 90°, the electronic device 101 may operate in a different state, for example a folded state. In embodiments, when the when the folding angle of the electronic device is between 130° and 180°, the electronic device 101 may operate in another different state, for example an unfolded state. In embodiments, even though the folding angle satisfies a specified condition based on a mounting state of the electronic device 101, the electronic device 101 may not operate in the half-folded state under the control of the processor 120. In embodiments, the specified condition may be, for example, a predetermined condition or a preset condition. Descriptions of examples of the mounting state may be given in more detail by the descriptions of FIGS. 6A and 6B to be described.

TABLE 1

| Folding angle | 0°~90° | 90°~130° | 130°~180° |
|---|---|---|---|
| Half-folded state | X | O | X |

According to an embodiment, when an event is received by the electronic device 101, the processor 120 may allow the display device 160 to display a notification object including information corresponding to the event. In embodiments, the event may be received when information about the event or a notification of the event is received by the electronic device 101, or when the event is detected or otherwise determined to have occurred by the electronic device 101. In this case, under the control of the processor 120, the notification object may be output to only at least part of the split region. For example, when the electronic device 101 is used in a table mode, the processor 120 may allow the display device 160 to continuously output content thus previously output, in a first display region (e.g., the display region positioned at an upper part of the electronic device 101) and to output the notification object in only a second display region (e.g., the display region positioned at a lower part of the electronic device 101). In addition to outputting the notification object to the display device 160, the processor 120 may provide various types of notification functions when an event is received by the electronic device 101. For example, the notification function may be intuitively provided using edge lighting and haptic functions without outputting specific details about the received event to a display.

According to an embodiment, the processor 120 may obtain at least one image through the camera module 180 and may process the obtained at least one image. For example, the processor 120 may extract a specified object (e.g., a face) from the obtained image. When it is determined that there is one face object in the image, the processor 120 may perform a function of user authentication (e.g., biometric authentication) using the object. The biometric authentication may be iris authentication or facial authentication. As another example, when it is determined that a plurality of faces objects are present in the image, the processor 120 may not perform a user authentication function.

The configuration of the electronic device 101 illustrated in FIG. 4 is only an example, and embodiments of the disclosure are not limited thereto. For example, the electronic device 101 may not include at least one of the components illustrated in FIG. 4. As another example, the electronic device 101 may further include a component not illustrated in FIG. 4.

Figure 5:
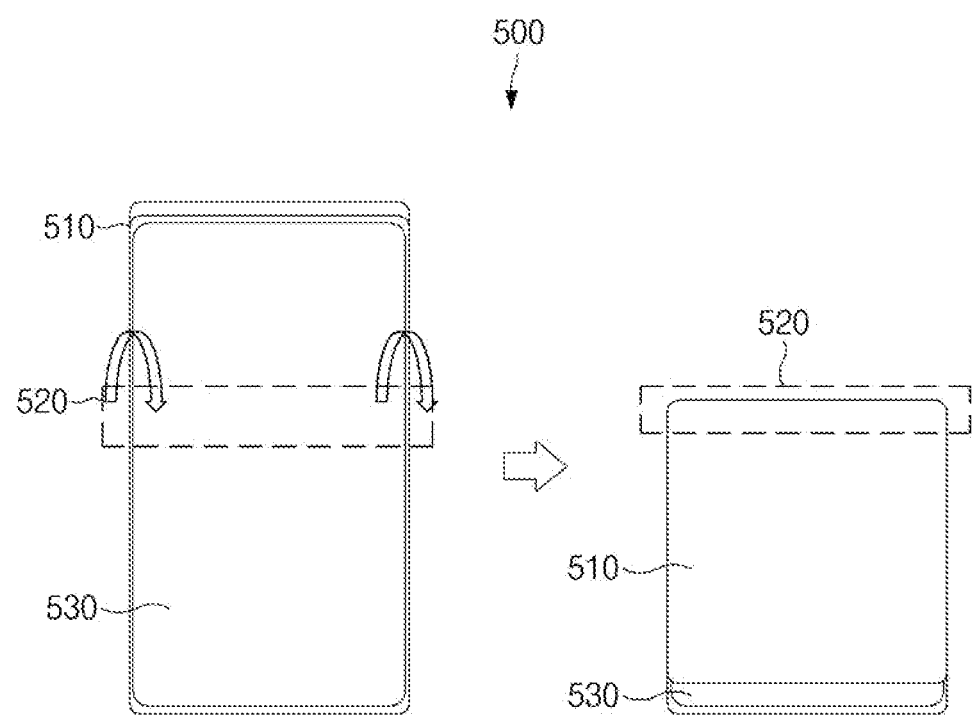
FIG. 5 illustrates an electronic device whose shape is changed, according to an embodiment.

FIG. 5 illustrates an electronic device whose shape is changed, according to various embodiments.

The shape of an electronic device 500 (e.g., the electronic device 101 of FIG. 1) may be physically changed while being folded/unfolded. For example, the electronic device may include housing and a display, each of which has flexibility in at least part of the housing and the display. The electronic device may be folded (e.g., closed) or unfolded (e.g., opened) around a portion having the flexibility of the electronic device 500. For example, the portion of the electronic device 500 having the flexibility may be referred to as a folding part or a folding structure. The folding part refers to a portion (e.g., a hinge) or region in which the shape of the electronic device 500 is capable of being changed, and is not limited to a specific structure.

According to an embodiment, the electronic device 500 (e.g., the electronic device 101 of FIG. 1) may be folded up and down. For example, the electronic device 500 may include a display 530 (e.g., the display 310 of FIG. 3) and housing 510, each of which has flexibility in a portion corresponding to at least one folding part 520. The electronic device 500 may be folded up and down around the folding part 520. FIG. 5 illustrates that the electronic device 500 is an in-fold electronic device in which the display 530 is folded inwardly. However, embodiments of the disclosure are not limited thereto. For example, at the folding part 520, the electronic device 500 may be out-folded, or may be both in-folded and out-folded. As another example, it is illustrated that the display 530 has one display, but embodiments of the disclosure are not limited thereto. The electronic device 500 may include a plurality of displays separated based on the folding part 520. The housing 510 may also include a plurality of housings separated based on the folding part 520. As another example, the electronic device 500 may be a combination of a plurality of electronic devices coupled to be folded around the folding part 520. In this case, the plurality of electronic devices may be coupled to each other by a separate structure (e.g., housing and/or a hinge).

A physical shape change of the electronic device 500 illustrated in FIG. 5 is an example, and embodiments of the disclosure are not limited thereto. For example, the electronic device may be folded or unfolded about any axis.

Figure 6A:
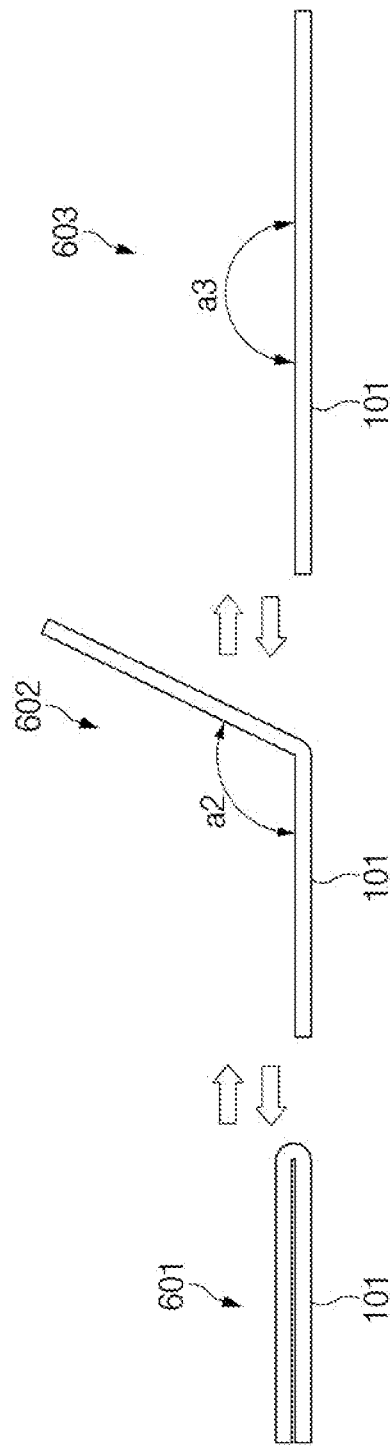
FIG. 6A illustrates an electronic device whose shape is changed, according to an embodiment.

FIG. 6A illustrates an electronic device whose shape is changed, according to various embodiments.

Referring to FIG. 6A, according to various embodiments, the electronic device 101 (e.g., the electronic device 500 of FIG. 5) may be used in various operation forms (e.g., a mobile mode 601, a table mode 602, and a tablet mode 603) in response to a folding angle.

In the mobile mode 601, the electronic device 101 may be used in the same form as a general bar-type smart phone. For example, in the mobile mode 601, the electronic device 101 may provide content to one region of a flexible display (e.g., the display 310 in FIG. 3). In the mobile mode 601, the folding angle may be 0 degrees.

In the table mode 602, the electronic device 101 may be used as a notebook computer while being positioned on a desk or on the user's hand. In the table mode 602, a folding angle (a2) may be within 90 to 130 degrees. In the table mode 602, under the control of the electronic device 101, a display region may be divided based on a folding part (e.g., the folding part 520 of FIG. 5), and then different content may be respectively output to divided regions. For example, when an event is received by the electronic device 101, a notification of the event may be output to a lower region, and content thus previously output may be continuously output to an upper region, under the control of the electronic device 101. According to an embodiment, when the electronic device 101 provides a biometric authentication function in the table mode 602, the electronic device 101 may apply an authentication algorithm different from that in the mobile mode 601 and the tablet mode 603. For example, in the table mode 602, the electronic device 101 may have a relatively long distance from a user compared to other modes, thereby applying an authentication algorithm for increasing an allowable range (e.g., a distance between the electronic device and the user or an angle of a face) of face recognition. According to various embodiments of the specification, in the table mode, the possibility of detecting a lower portion of a face may be high due to a camera angle between a user's face and the electronic device, thereby applying an algorithm that performs authentication by weighting features of the lower part of the face.

In embodiments, examples of the above-described face recognition allowable range may be described in more detail with reference to FIGS. 7A and 7B to be described below.

In the tablet mode 603, the electronic device 101 may be used in the same shape as a general tablet PC. For example, the electronic device 101 may provide content to one region of a flexible display (e.g., the display 310 in FIG. 3). In the tablet mode 603, a folding angle (a3) of the electronic device 101 may be 180 degrees.

Figure 6B:
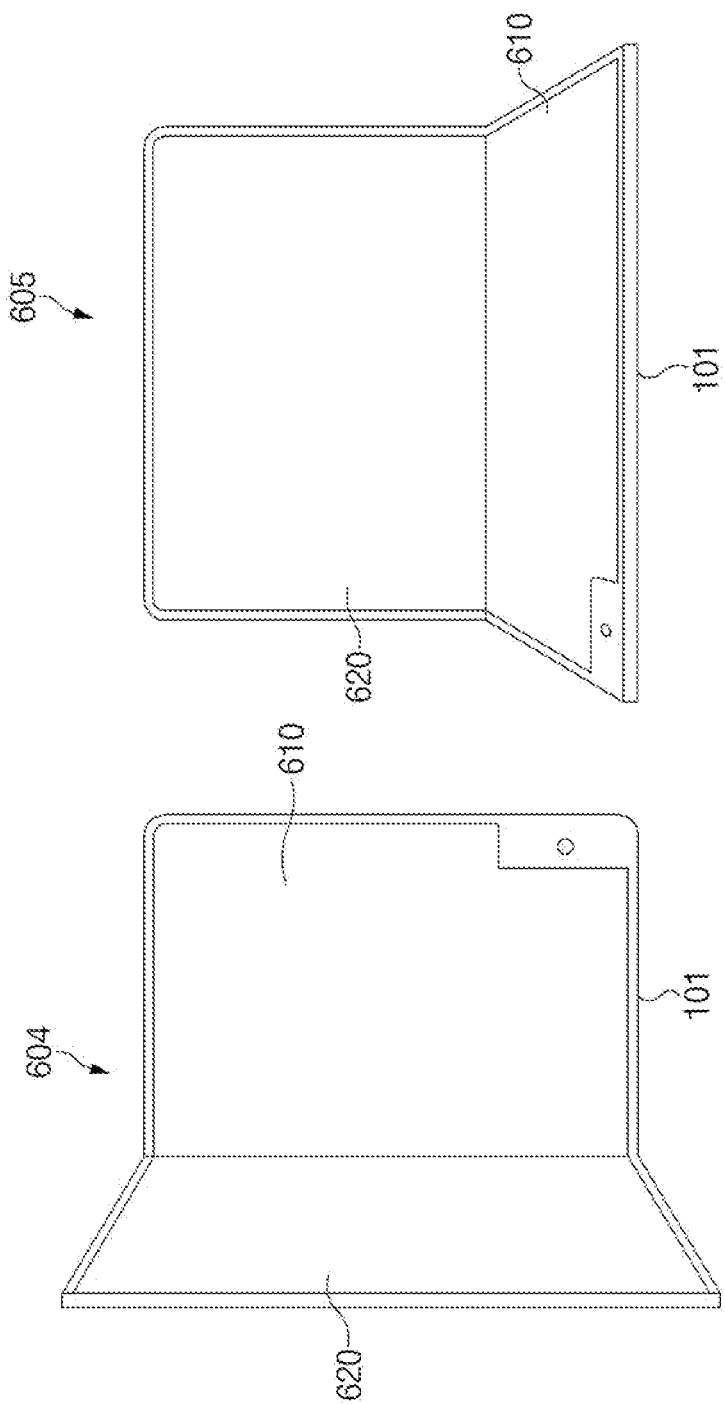
FIG. 6B illustrates an electronic device whose shape is changed, according to an embodiment.

FIG. 6B illustrates an electronic device whose shape is changed, according to various embodiments.

According to various embodiments of the specification, while being folded at a specified angle (e.g., 90 to 130 degrees), the electronic device 101 may be mounted and used in various shapes (e.g., a first mounting state 604 and a second mounting state 605).

According to an embodiment, a user may employ the electronic device 101 in the first mounting state 604. The first mounting state 604 may refer to a state where a side part of the electronic device 101 is placed on a floor while the electronic device 101 is folded at a specified angle. The electronic device 101 may output content to one region (e.g., a first display region 610 or a second display region 620) of a flexible display (e.g., the display 310 of FIG. 3).

According to an embodiment, the second mounting state 605 may refer to a state where the user places the housing including the first display region 610 on the floor while the electronic device 101 is folded. The electronic device 101 may output content to one region (e.g., a first display region 610 or a second display region 620) of a flexible display (e.g., the display 310 of FIG. 3).

A processor (e.g., the processor 120 of FIG. 1) may determine an operating mode (e.g., a mobile mode, a table mode, or a tablet mode) of the electronic device 101 based on a folding angle of the electronic device 101 obtained using a sensor module (e.g., the sensor module 176 of FIG. 1). However, even though the folding angle satisfies a specified condition in a mounting state (the first mounting state 604 or the second mounting state 605), the electronic device 101 may not operate in a table mode state.

Figure 7A:
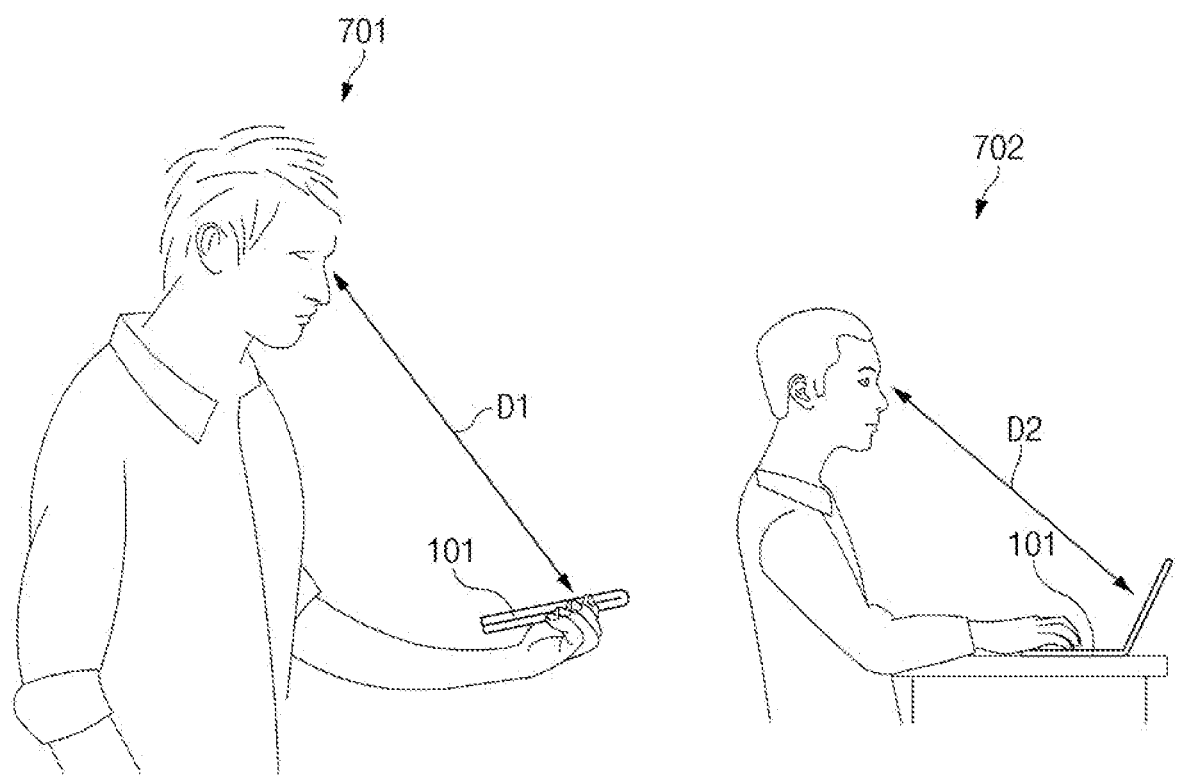
FIG. 7A illustrates a distance between a user and an electronic device that varies depending on a shape in which the user employs the electronic device, according to an embodiment.

FIG. 7A illustrates a distance between a user and an electronic device that varies depending on a shape in which the user employs the electronic device, according to an embodiment.

According to various embodiments of the specification, the foldable electronic device 101 may be used in various arrangements, for example arrangement 701 and arrangement 702 depending on a folding angle, a shape in which it is gripped by a user, and the like. For example, the user may employ the electronic device 101 by gripping a lower part in his/her hand in a mobile mode state (e.g., the mobile mode 601 of FIG. 6A). As another example, the user may employ the electronic device 101 in a table mode (e.g., the table mode 602 of FIG. 6A).

Distances D1 and D2 between the user's face and the electronic device 101 may be different from each other depending on a shape in which the user employs the electronic device 101. For example, the distance D1 (e.g., 20 to 50 cm) may be lower than the distance D2 (e.g., 20 to 90 cm).

According to an embodiment, the electronic device 101 may obtain at least one image including the user's face, using a camera module (e.g., the camera module 180 of FIG. 4). The size of a face included in at least one image obtained by the camera module 180 may be determined by the distance between the user and the electronic device 101. In this case, the electronic device 101 may be configured to succeed in face recognition as long as the size of the face included in the at least one image is not less than a specified size.

Referring to arrangement 701 of FIG. 7A, according to an embodiment, the user may employ the electronic device 101 in a mobile mode (e.g., the mobile mode 601 of FIG. 6A) while the folding angle is 0 degrees. When an event is received by the electronic device 101, a display device (the display device 160 of FIG. 4) may provide a notification function to output a notification object including information about the received event in one region (e.g., the first display region 610 or the second display region 620). The user may identify additional details related to the event through face recognition. The user may attempt to recognize a face while a distance to the electronic device is D1.

Referring to arrangement 702 of FIG. 7A, according to an embodiment, the user may employ the electronic device 101 in a table mode (e.g., the table mode 602 of FIG. 6A) while the folding angle is within 90 to 130 degrees. When an event is received by the electronic device 101, a display device (the display device 160 of FIG. 4) may provide a notification function to output a notification object including information about the received event in one region (e.g., the first display region 610 or the second display region 620). The user may identify additional details related to the event through face recognition. The user may attempt to recognize a face while the distance to the electronic device is D2. In arrangement 702, the size of a face included in at least one image obtained by the electronic device 101 may be smaller than that in arrangement 701. The electronic device 101 may apply an authentication algorithm that increases a face recognition allowable range while in arrangement 702. For example, as in arrangement 702, when a user employs the electronic device 101 in the table mode in the half-folded state, a processor (e.g., the processor 120 of FIG. 4) may extend and apply the face recognition allowable range according to the distance between the electronic device 101 and the user. Table 2 shows examples of the face recognition allowable range according to an operating mode of the electronic device 101.

TABLE 2

| Operating mode Recognition range | Mobile mode | Table mode | Tablet mode |
| --- | --- | --- | --- |
| Distance between electronic device and user | 20 to 50 cm | 20 to 90 cm | 20 to 50 cm |

Figure 7B:
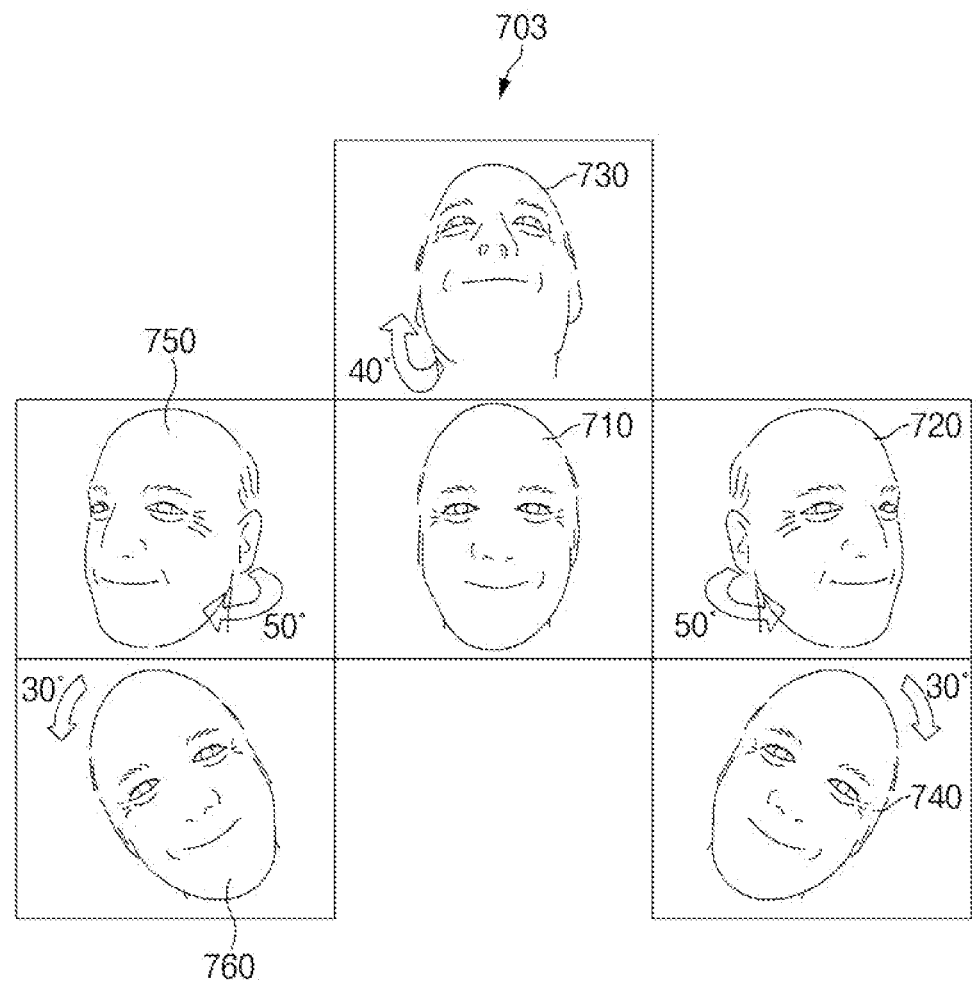
FIG. 7B illustrates a user's face image obtained by a camera in a biometric authentication process based on face recognition, according to an embodiment.

FIG. 7B illustrates a user's face image obtained by a camera in a biometric authentication process based on face recognition, according to an embodiment.

According to various embodiments of the specification, for an operation of a face recognition function, the electronic device 101 may obtain at least one image including a user's face using a camera module (e.g., the camera module 180 of FIG. 4). Referring to arrangement 703 of FIG. 7B, according to an embodiment, the user's face image obtained by the electronic device 101 may refer to various face images 710, 720, 730, 740, 750, and 760.

According to an embodiment, when the user employs the electronic device 101 in a table mode in a half-folded state, a processor (e.g., the processor 120 of FIG. 4) may extend a face recognition allowable range according to a distance between the electronic device 101 and the user. Table 3 shows examples of the face recognition allowable range according to an operating mode of the electronic device 101.

TABLE 3

| Operating mode Recognition range | Mobile mode | Table mode | Tablet mode |
| --- | --- | --- | --- |
| Face angle | Up and down: about 20 degrees Left and right: about 30 degrees | Up and down: about 40 degrees Left and right: about 50 degrees | Up and down: about 20 degrees Left and right: about 30 degrees |

Figure 8:
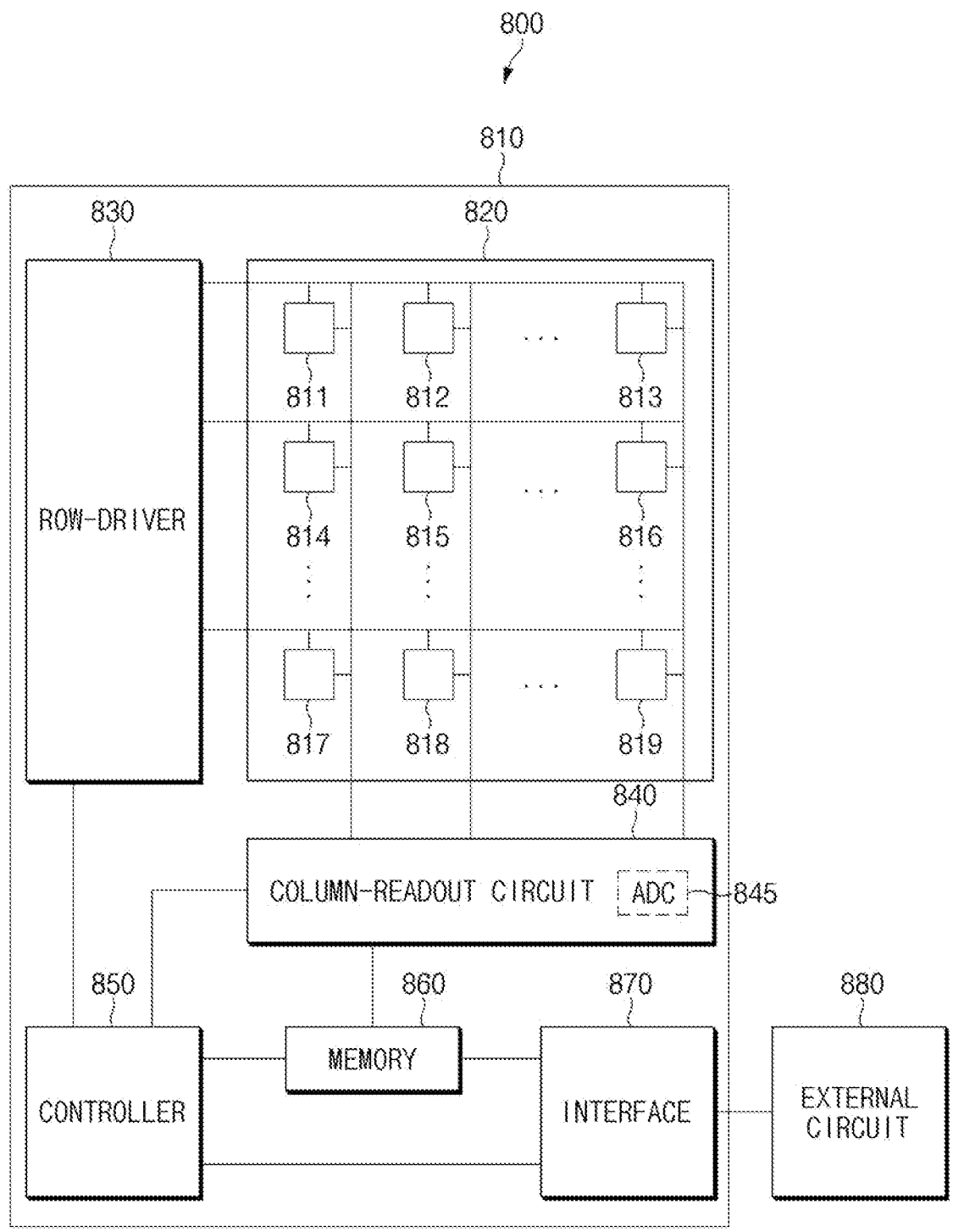
FIG. 8 is a block diagram for describing a structure of an image sensor, according to an embodiment.

FIG. 8 is a block diagram 800 for describing a structure of an image sensor, according to various embodiments.

According to an embodiment of the specification, an image sensor 810 (e.g., the image sensor 230 of FIG. 2) may be a component of a camera module (e.g., the camera module 180 of FIG. 1) provided in an electronic device (e.g., the electronic device 101 of FIG. 1).

Referring to FIG. 8, according to various embodiments, the image sensor 810 may include at least one of a pixel array 820, a row-driver 830, a column-readout circuit 840, a controller 850, a memory 860, and an interface 870.

The pixel array 820 may include a plurality of pixels 811 to 819. For example, the pixel array 820 may have a structure in which the plurality of pixels 811 to 819 are arranged in an M×N matrix ('M' and 'N' are natural numbers). The pixel array 820 in which the plurality of pixels 811 to 819 are arranged in an M×N two-dimensional shape may have 'M' rows and 'N' columns. The pixel array 820 may include a plurality of photo-sensing elements, for example, photo diodes or pinned photo diodes. The pixel array 820 may detect light using the plurality of photo-sensing elements, and may convert the light into an analog electrical signal to generate an image signal.

The row-driver 830 may drive the pixel array 820 in units of rows. For example, the row-driver 830 may output, to the pixel array 820, a transmission control signal for controlling a transmission transistor, a reset control signal for controlling a reset transistor, or a selection control signal for controlling a selection transistor. Each of the plurality of pixels 811 to 819 included in the pixel array 820 includes the transmission transistor, the reset transistor, or the selection transistor. The row-driver 830 may determine a row to be read out. The column-readout circuit 840 may receive an analog electrical signal generated by the pixel array 820. For example, the column-readout circuit 840 may receive an analog electrical signal from a column line selected from among a plurality of columns constituting the pixel array 820. The column-readout circuit 840 may include an analog-to-digital converter (hereinafter, referred to as "ADC") 845 that is capable of converting the analog electrical signal received from the selected column line into pixel data (or a digital signal) and outputting the pixel data. In embodiments, an operation of the column-readout circuit 840 that receives an analog electrical signal from the pixel array 820, converts the received analog electrical signal into the pixel data using the ADC 845, and outputs the pixel data may be referred to as "read out". The column-readout circuit 840 and the ADC 845 may determine a column to be read out.

According to an embodiment, the column-readout circuit 840 of the image sensor 810 may include the plurality of ADCs 845. The ADCs 845 may be connected in parallel with a plurality of photodiodes included in the pixel array 820, respectively. The ADCs 845 may quickly convert analog electrical signals simultaneously received from the plurality of photodiodes into pixel data based on a parallel structure.

According to an embodiment, for an operation in a low-power state of an electronic device, the column-readout circuit 840 of the image sensor 810 may perform readout at a low frame rate (e.g., 10 frames per second (fps)). For example, the meaning of performing readout at 10 fps may mean performing an operation of receiving an analog electrical signal from the pixel array 820, converting the received analog electrical signal into pixel data using the ADC 845, and outputting the pixel data once per 1/10 seconds. That is, performing readout at 10 fps may mean outputting ten image frames per second.

The controller 850 may obtain an image frame based on pixel data received from the column-readout circuit 840. The controller 850 may output the image frame to an external circuit 880 (e.g., an image signal processor (ISP), a processor, a communication circuit, or an external server) through the interface 870. According to an embodiment, the controller 850 may generate a transmission control signal for controlling a transmission transistor, a reset control signal for controlling a reset transistor, or a selection control signal for controlling a selection transistor in each of the plurality of pixels 811 to 819 and may provide the generated signal to the row-driver 830. Moreover, the controller 850 may generate a selection control signal for selecting at least one column line among a plurality of column lines constituting the pixel array 820, and may provide the generated signal to the column-readout circuit 840. For example, on the basis of the selection control signal provided from the controller 850, the column-readout circuit 840 may enable some column lines among the plurality of column lines and may disable the other column lines thereof. Moreover, the controller 850 may be implemented as a processor (e.g., the processor 120 of FIG. 1) including a central processing unit (CPU) or an application processor (AP), or as the type of a block or module.

According to an embodiment, the memory 860 may store at least one image frame read out from the column-readout circuit 840 at an N-th frame rate (e.g., 60 fps) or an M-th frame rate (e.g., 30 fps), and may deliver the stored at least one image frame to the external circuit 880 (e.g., ISP, a processor, a communication circuit, or an external server) through the interface 870. That is, the memory 860 may store at least one image frame read out from the column-readout circuit 840 once per 1/60 seconds or once per 1/30 seconds, and may deliver the stored at least one image frame to the external circuit 880 through the interface 870. There is no limit to a speed for delivering an image frame to the external circuit 880. For example, the electronic device (e.g., the electronic device 101 in FIG. 1) may directly deliver the read-out image frame to the external circuit 880 through the interface 870 without storing the read-out image frame in the memory 860.

In embodiments, the controller 850 may store only some image frames among N-th image frames, which are read out at the N-th frame rate (e.g., 10 fps) through the column-readout circuit 840, in the memory 860, thereby substantially obtaining the same effect as obtaining M-th image frames that are read out at the M-th frame rate (e.g., 5 fps). For example, the controller 850 may store only one image frame among eight image frames, which are read out for 8/10 seconds at 10 fps, in the memory 860. When only image frames selected at a ratio of 1:8 from among the image frames read out at 10 fps are stored in the memory 860, the image frames stored in the memory 860 may be substantially the same as image frames read out at 5 fps through the column-readout circuit 840. For example, when a video composed of only image frames obtained at a period of 1/5 seconds is defined as a 'video of 5 fps', a video composed of only image frames selected at a ratio of 1:8 from among the image frames read out at 10 fps may be defined as the video of 5 fps. Moreover, a video composed of only image frames read out at 120 fps through the column-readout circuit 840 may also be defined as the video of 5 fps.

According to an embodiment, the column-readout circuit 840 may perform readout at a first FPS (e.g., 10 to 30 fps) less than a specified FPS (e.g., 60 fps). For example, for an operation of a display in a low-power state (e.g., a low-power preview mode), the controller 850 may store a plurality of image frames, which are read out at first fps through the column-readout circuit 840, in the memory 860.

The controller 850 may allow the camera module 180 to process or edit pixel information received from the processor 120. The processor 120 may allow the controller 850 to operate only some of the plurality of pixels 811 to 819 included in the pixel array 820 based on the pixel information received from the processor 120. For example, the controller 850 may allow the row-driver 830 to generate a selection signal for selecting one row line from a plurality of row lines. For example, the one row line may mean an even-numbered row line or an odd-numbered row line. For example, the controller 850 may allow the column-readout circuit 840 to generate a selection signal for selecting one column line from a plurality of column lines. For example, the one column line may mean an even-numbered column line or an odd-numbered column line. As another example, the image signal processor may deliver the downsized image to the display based on at least one image data obtained through a camera. For example, when the electronic device 101 performs a face recognition function, the processor 120 may allow the electronic device 101 to be driven with low power by reading out only a region corresponding to a face among the obtained at least one image. The downsized image may be output on a display in a low-power state. As such, the electronic device may selectively use pixels, thereby reducing power consumption and effectively performing data processing or calculation of the processor 120. Examples of the operating content of the image sensor 810 as described above may be described in more detail with reference to FIGS. 9 and 10 to be described below.

The configuration of the image sensor 810 illustrated in FIG. 8 is only an example, and embodiments of the disclosure are not limited thereto. For example, the image sensor 810 may not include at least one of the components illustrated in FIG. 8. As another example, the image sensor 810 may further include a component not illustrated in FIG. 8.

Figure 9:
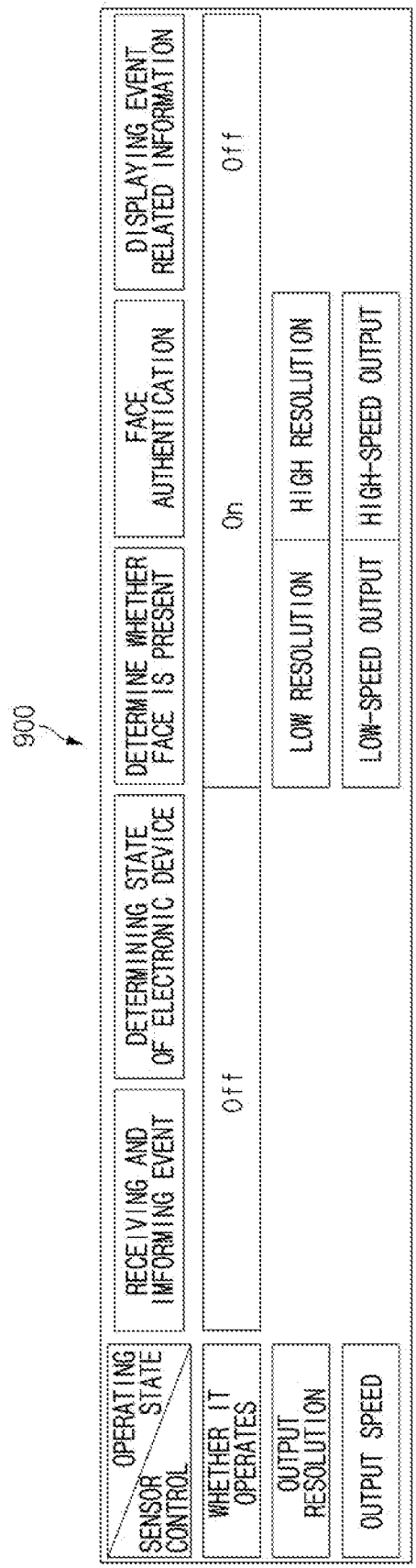
FIG. 9 illustrates a state of an image sensor according to an operating state of an electronic device, according to an embodiment.

FIG. 9 illustrates a table 900 indicating various states of an image sensor according to an operating state of an electronic device, according to an embodiment.

According to various embodiments of the specification, the electronic device 101 may allow an image sensor to perform face recognition and/or biometric authentication functions with low power.

According to an embodiment, an electronic device (e.g., the electronic device 101 of FIG. 1) may turn off the image sensor while it is determined by a processor (e.g., the processor 120 of FIG. 1) whether it is in a half-folded state, based on a folding angle of the electronic device 101 obtained using a sensor module (e.g., the sensor module 176 in FIG. 4). When it is determined that the electronic device 101 is operating in a table mode (e.g., the table mode 602 in FIG. 6A) in a half-folded state, the processor 120 may activate an image sensor (e.g., the image sensor 230 of FIG. 2) and may perform face recognition and/or biometric authentication functions (e.g., biometric authentication based on facial recognition or iris recognition).

According to an embodiment, the electronic device 101 may determine whether a user's face is present in at least one image obtained using the camera module 180. In a process of determining whether a face is present, the camera module 180 may operate in a first mode provided for user recognition. The first mode may operate with less power consumption or current consumption than a second mode to be described. For example, in the first mode, the camera module 180 may allow the image sensor to perform readout at a first output speed (e.g., 15 fps). As another example, in the first mode, the camera module 180 may allow the image sensor to obtain an image having a first resolution (e.g., 640×480). In the process of determining whether a face is present, the image sensor may output an image having the first resolution at the first output speed. The processor 120 may determine whether the user's face is present, based on the image of the first resolution. When it is determined that a face is present, the electronic device 101 may perform a biometric authentication function based on face recognition.

According to an embodiment, the electronic device 101 may perform a biometric authentication function when it is determined in the face recognition process that the user's face is present. In a process of performing the biometric authentication function, the camera module 180 may operate in the second mode provided for user authentication. The second mode may operate with power consumption or current consumption higher than the first mode. For example, in the second mode, the camera module 180 may allow the image sensor to perform readout at a second output speed (e.g., 30 fps). As another example, in the second mode, the camera module 180 may allow the image sensor to obtain an image having a second resolution (e.g., 1920× 1080). The second output speed (e.g., 30 fps) and second resolution (e.g., 1920×1080) may refer to values higher than the first output speed (e.g., 15 fps) and first resolution (e.g., 640×480). In this case, the image sensor may output an image of the second resolution at the second output speed. The processor 120 may perform a biometric authentication function based on the image of the second resolution.

In embodiments, in performing the biometric authentication function, the electronic device 101 may allow the image sensor to read out only a partial region of at least one image obtained by the camera module 180 in the second mode. For example, in the second mode, the electronic device 101 may perform biometric authentication based on facial recognition using the camera module 180. In this case, in the second mode, the electronic device 101 may perform biometric authentication by reading out only the region corresponding to the user's face among at least one image obtained by the camera module 180. For example, the region corresponding to the user's face may be a region used by the electronic device 101 in the process of determining whether the face is present, in the first mode. In this way, the electronic device 101 may efficiently perform the biometric authentication function. For example, because only the region corresponding to the face needs to be extracted and read out, the biometric authentication process may be performed in a shorter time.

The frame rates (15 fps and 30 fps) and the resolutions (640×480 and 1920×1080) used in this specification may vary depending on settings of an electronic device (e.g., the electronic device 101 of FIG. 1) or the performance of an interface (e.g., the interface 177 of FIG. 1).

Figure 10:
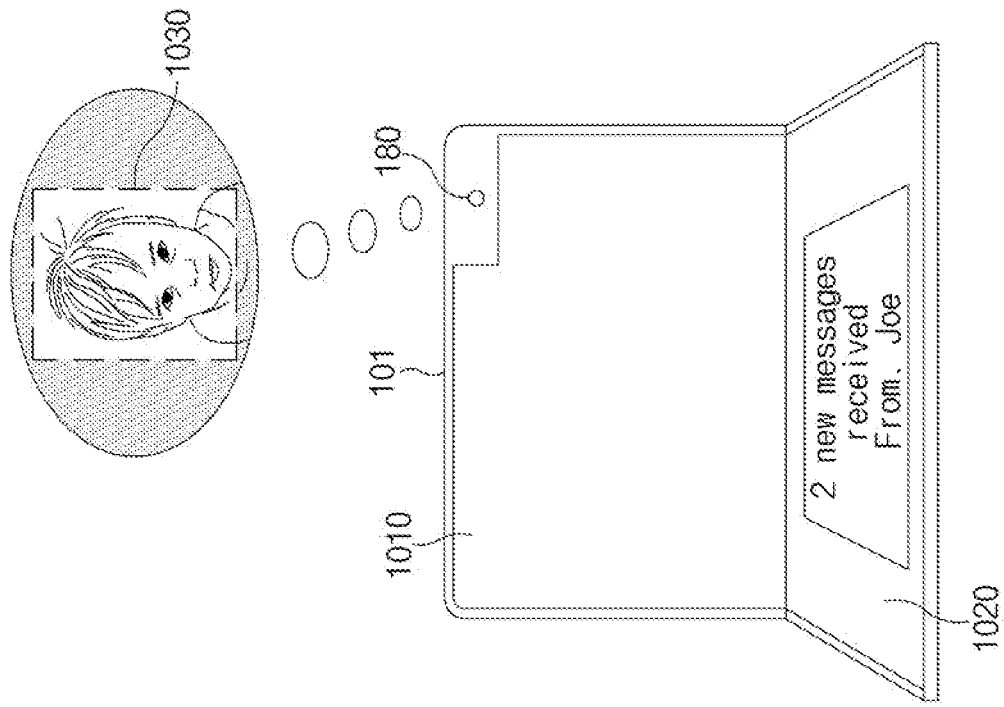
FIG. 10 illustrates an electronic device that selectively reads out an image, according to an embodiment.
Figure 10:
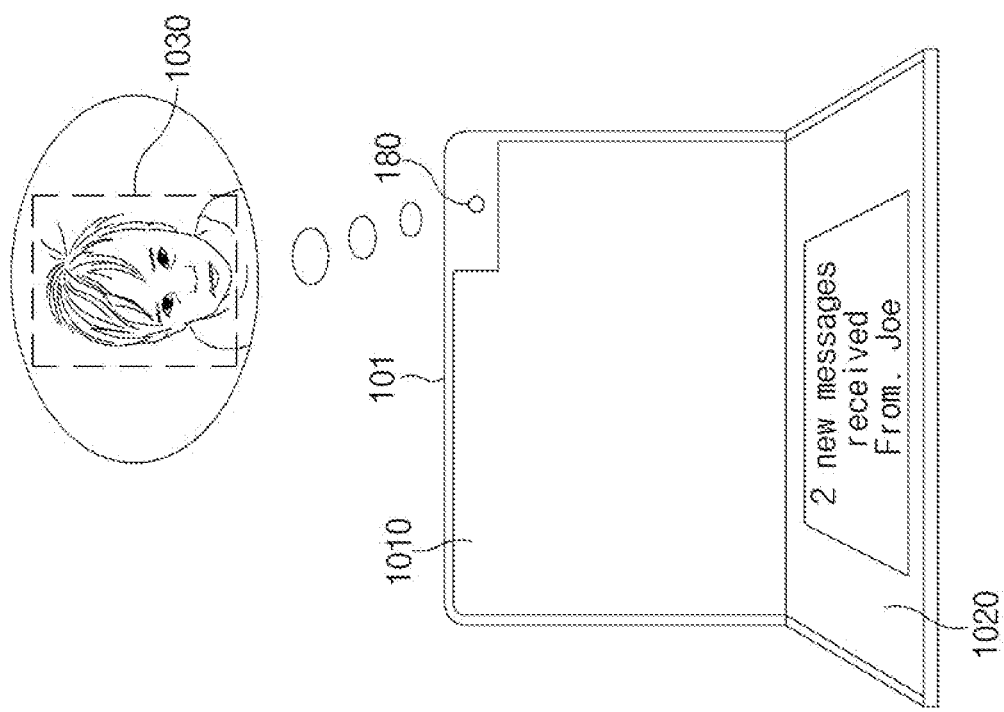

FIG. 10 illustrates an electronic device that selectively reads out an image, according to an embodiment.

According to an embodiment, an electronic device 101 may operate in a table mode (e.g., the table mode 602 in FIG. 6A) in a half-folded state. In the table mode 602, the electronic device 101 may provide a user with various pieces of content through a first display region 1010 and/or a second display region 1020. When an event is received by the electronic device 101, a notification object for providing a notification that the event is received may be displayed in the second display region 1020. In this case, the first display region 1010 may continuously output content, which is originally provided, regardless of whether an event is received. After the notification object is displayed, the electronic device 101 may perform face recognition and/or biometric authentication functions based on at least one image obtained using the camera module 180.

According to an embodiment, in a process of performing face recognition and/or biometric authentication functions, the electronic device 101 may extract and read out only a region 1030 corresponding to a user's face from among the at least one image. In embodiments, when face recognition and/or biometric authentication functions are not successfully performed on the at least one image (e.g., when a face is closer or farther than the specified distance range), the electronic device 101 may provide a guide for successful biometric authentication. For example, the guide may be provided in a form of an image and/or text including information for providing the user's location such that an external object (e.g., a face) is positioned within a specified distance range from the electronic device 101. For example, the guide may be provided in a pop-up form on the first display region 1010 and/or the second display region 1020.

After the authentication process is completed, the electronic device may output content related to the received event on the first display region 1010 and/or the second display region 1020.

Figure 11:
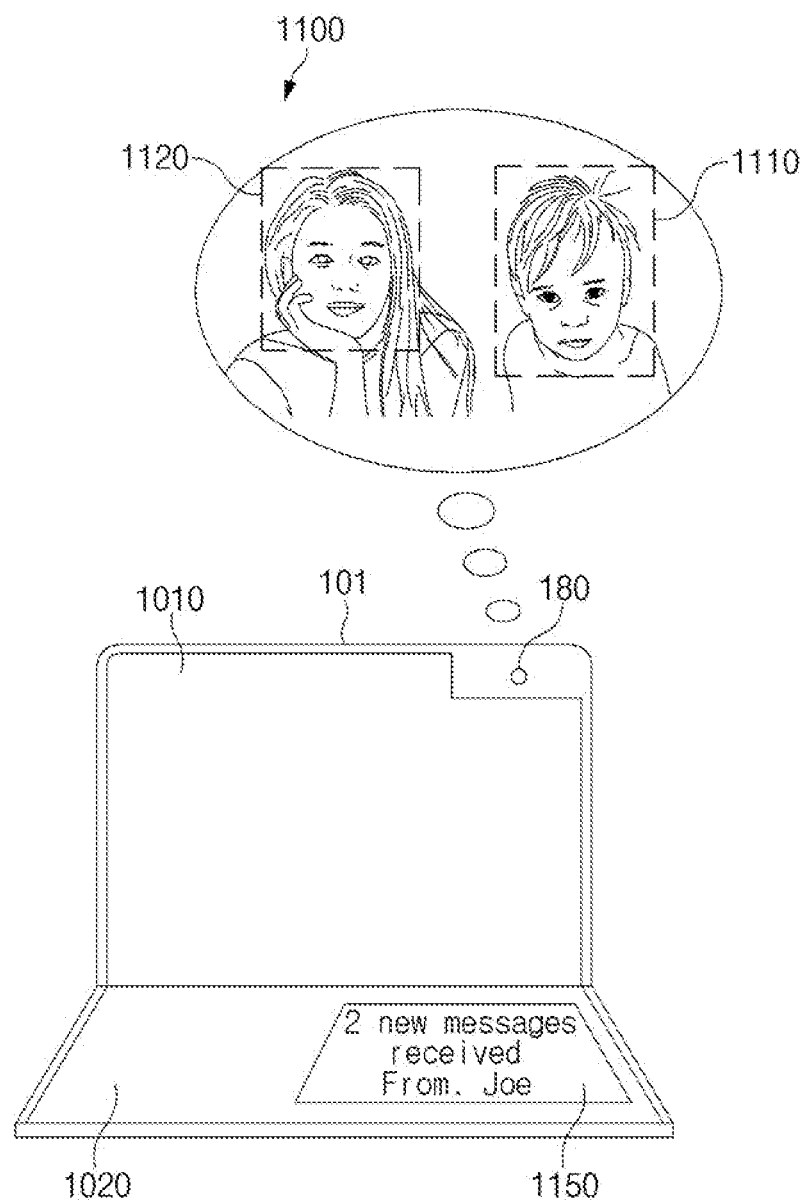
FIG. 11 illustrates a notification operation of an electronic device when a plurality of faces are detected, according to an embodiment.

FIG. 11 illustrates a notification operation 1100 of an electronic device when a plurality of faces are detected, according to an embodiment.

According to various embodiments of the specification, when a user employs the electronic device 101 in a table mode state (e.g., the table mode 602 in FIG. 6A) together with another user, a notification function for an event received by the electronic device 101 may be restrictively provided. For example, the electronic device 101 may provide content to the first display region 1010. When receiving an event, the electronic device 101 may provide a notification object 1150 to the second display region 1020.

According to an embodiment, when identifying two or more face objects 1110 and 1120 in a process of performing a face recognition function, the electronic device 101 may output a notification object 1150 for restrictively displaying content corresponding to the received event without performing a biometric authentication function. The notification object 1150 may include event reception time, sender information, the number of received events, message content, and the like. The limit range of a notification function may vary depending on the user's settings. For example, when the two or more face objects 1110 and 1120 are identified, the electronic device 101 may be configured to provide the notification function to display an object after excluding at least one of the content included in the notification object 1150.

According to an embodiment, when identifying the two or more face objects 1110 and 1120 in a process of performing a face recognition function, the electronic device 101 may change a location for displaying the notification object 1150 corresponding to the received event. For example, the electronic device 101 may extract a location of the face object 1110 of the user corresponding to the electronic device 101 among the identified two or more face objects 1110 and 1120 and may display the notification object 1150 in a region corresponding to the location. For example, the region may be a region close to the face object 1110 of the user.

Figure 12:
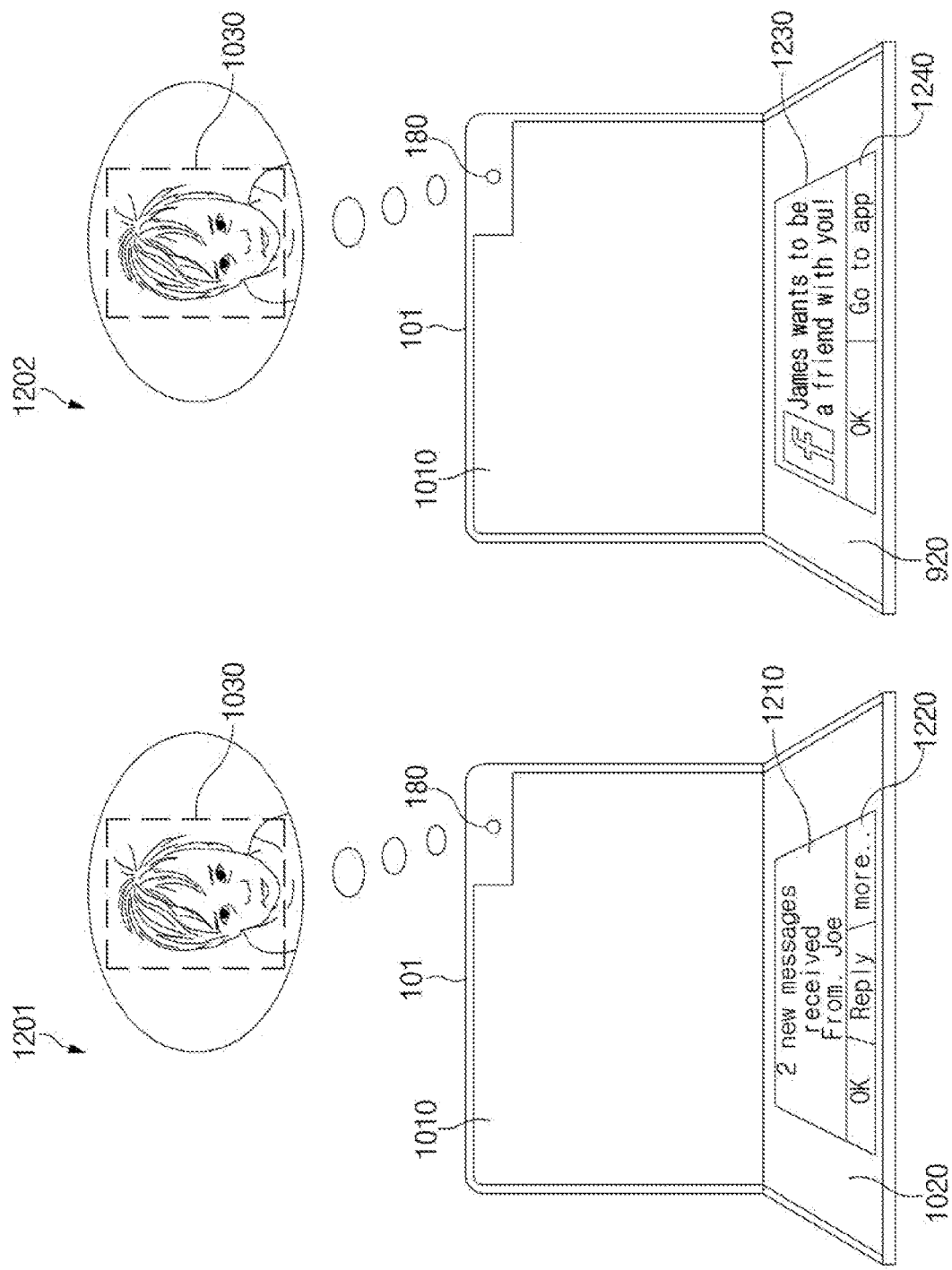
FIG. 12 illustrates various notification operations of an electronic device according to an application, according to an embodiment.

FIG. 12 illustrates various notification operations of an electronic device according to an application, according to an embodiment.

According to various embodiments of the specification, the electronic device 101 may provide a notification function to differently display the content of a notification object for each application. For example, the electronic device 101 may store a security level suitable for each application and may restrictively provide a notification function depending on the security level.

Referring to arrangement 1201 of FIG. 12, according to an embodiment, the electronic device 101 may receive an instant message and may provide a notification function to display a first notification object 1210 corresponding to the message.

According to an embodiment, the first notification object 1210 may be displayed on the second display region 1020. The first notification object 1210 may include a first user interface 1220 (e.g., a user interface including "OK", "Reply" and "more" buttons). After successfully performing face recognition and/or biometric authentication, the electronic device 101 may provide a corresponding function based on receiving a touch input corresponding to a button included in the first user interface 1220.

Referring to arrangement 1202 of FIG. 12, according to an embodiment, the electronic device 101 may provide a notification function including a second notification object 1230 corresponding to an event received from a social network service (SNS) application.

According to an embodiment, the second notification object 1230 may be displayed on the second display region 1020. The second notification object 1230 may include a second user interface 1240 (e.g., a user interface including "OK" and "Go to app" buttons). After successfully performing face recognition and/or biometric authentication, the electronic device 101 may provide a corresponding function based on receiving a touch input corresponding to a button included in the second user interface 1240.

Figure 13:
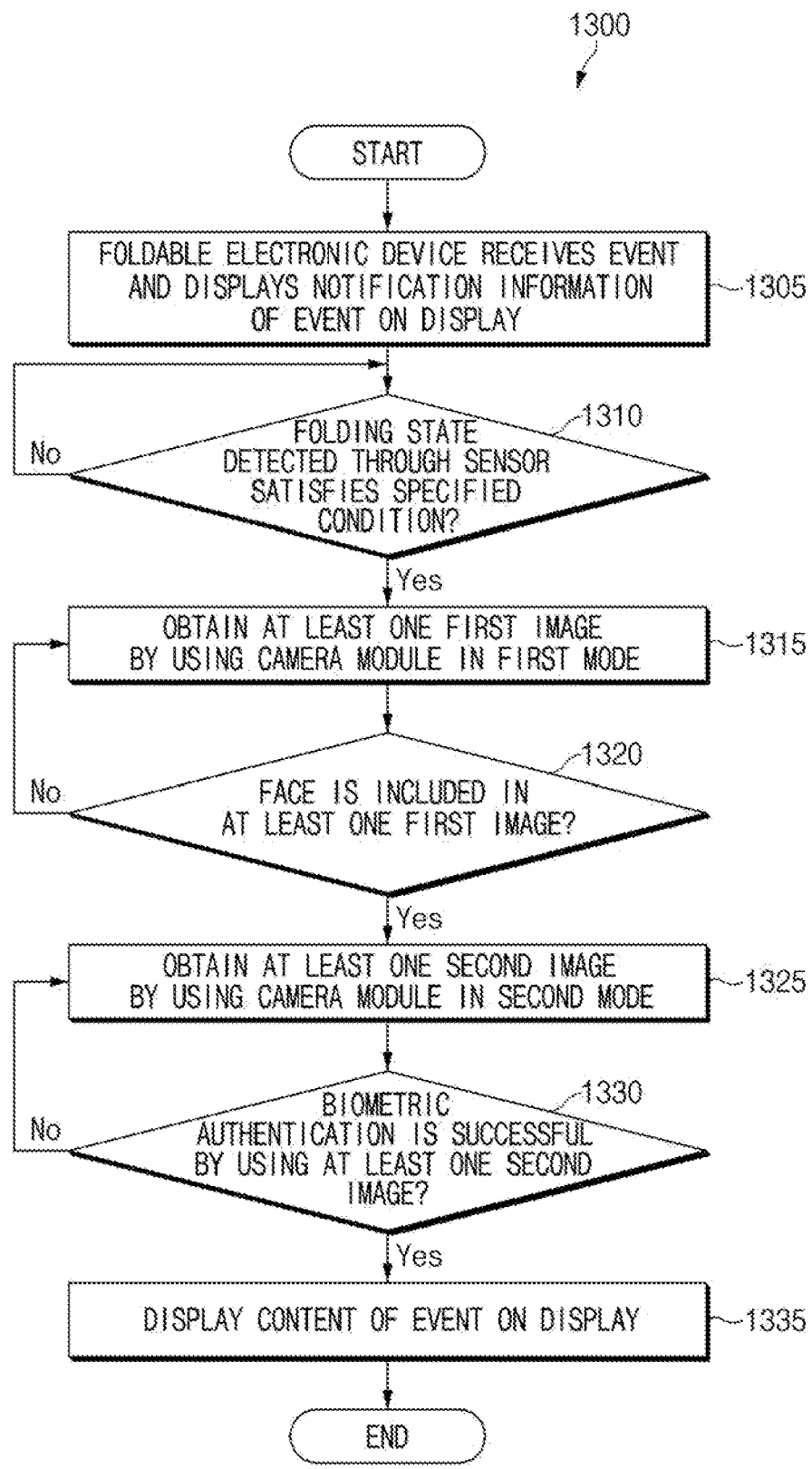
FIG. 13 illustrates a flowchart of a biometric authentication operation of an electronic device, according to an embodiment.

FIG. 13 illustrates a flowchart of a biometric authentication process 1300 of an electronic device, according to various embodiments.

Referring to FIG. 13, according to an embodiment, in operation 1305, an electronic device (e.g., the electronic device 101 of FIG. 1) may receive an event and may display notification information on a display. For example, the notification information may include content (e.g., event reception time, sender information, the number of received events, or message content) corresponding to the event.

In operation 1310, the electronic device 101 may determine whether a folding state detected through a sensor module (e.g., the sensor module 176 of FIG. 1) satisfies a specified condition. For example, the specified condition may mean that the folding angle of the electronic device 101 needs to be within 90 to 130 degrees. This may be defined as a half-folded state of the folding state that satisfies the specified condition.

When the folding state of the electronic device 101 satisfies the specified condition (e.g., operation 1310—Yes) in operation 1310, the electronic device may perform operation 1315.

When the folding state of the electronic device 101 does not satisfy the specified condition (e.g., operation 1310—No) in operation 1310, the electronic device 101 may continue to perform operation 1310.

According to an embodiment, in operation 1315, the electronic device 101 may obtain at least one first image using a camera module (e.g., the camera module 180 of FIG. 1) in a first mode. For example, the first mode may be an operating mode of the camera module operating with lower power than the second mode. The electronic device 101 may restrict an operating time of the camera module. The operation time may be set by a user. For example, when the operating time of the camera module exceeds a specified time in the first mode, the electronic device 101 may allow the camera module to terminate an operation of the camera module and may allow a display to be deactivated.

According to an embodiment, in operation 1320, the electronic device 101 may determine whether a face is present, based on the obtained at least one first image. The electronic device 101 may search for a face object from the at least one first image. For example, when identifying two or more face objects, the electronic device 101 may determine that face recognition has failed. As another example, when identifying two or more face objects, the electronic device 101 may determine the user's face corresponding to the electronic device 101. In this case, the electronic device 101 may extract a location of the user's face object and may display a notification object in a region corresponding to the location. For example, the region corresponding to the location may be a region close to the user's face object.

When it is determined that a face is present in the at least one first image (e.g., operation 1320—Yes) in operation 1320, the electronic device may perform operation 1325.

When it is determined that there is no face in the at least one first image (e.g., operation 1320—No) in operation 1320, the electronic device 101 may continue to perform operation 1315.

According to an embodiment, in operation 1325, the electronic device 101 may obtain at least one second image using the camera module in the second mode. For example, the second mode may be the operating mode of the camera module operating with power higher than the first mode. The electronic device 101 may restrict an operating time of the camera module. The operation time may be set by a user. When it is determined that the face is present, the electronic device 101 may display at least part of the content (e.g., event reception time, sender information, the number of received events, or message content) related to the event on the display.

According to an embodiment, in operation 1330, the electronic device 101 may perform a biometric authentication function using at least one second image. For example, the biometric authentication may be facial recognition-based biometric authentication. The electronic device 101 may read out only one region from the at least one second image. For example, the electronic device 101 may perform face recognition by reading out only one region, for example a region including a face object. When the biometric authentication through the at least one second image fails, the electronic device 101 may display a user interface for providing a guide for the success of the biometric authentication on the display. For example, the user interface may be provided in a form of an image and/or text including information for providing the user's location such that a face is positioned within a specified distance range from the electronic device 101. For example, the user interface may be provided in a pop-up form on a first display region (e.g., the first display region 1010 of FIG. 10) and/or a second display region (e.g., the second display region 1020 of FIG. 10).

When biometric authentication is successful (e.g., operation 1330—Yes) in operation 1330, the electronic device may perform operation 1335.

When the biometric authentication fails (e.g., operation 1330—No) in operation 1330, the electronic device 101 may continue to perform operation 1325.

According to an embodiment, in operation 1335, the electronic device 101 may display content related to the received event on the display. For example, the content related to the event may include event reception time, sender information, the number of received events, and/or message content. In this case, the electronic device 101 may output the content related to the event to at least part of the second display region.

Figure 14:
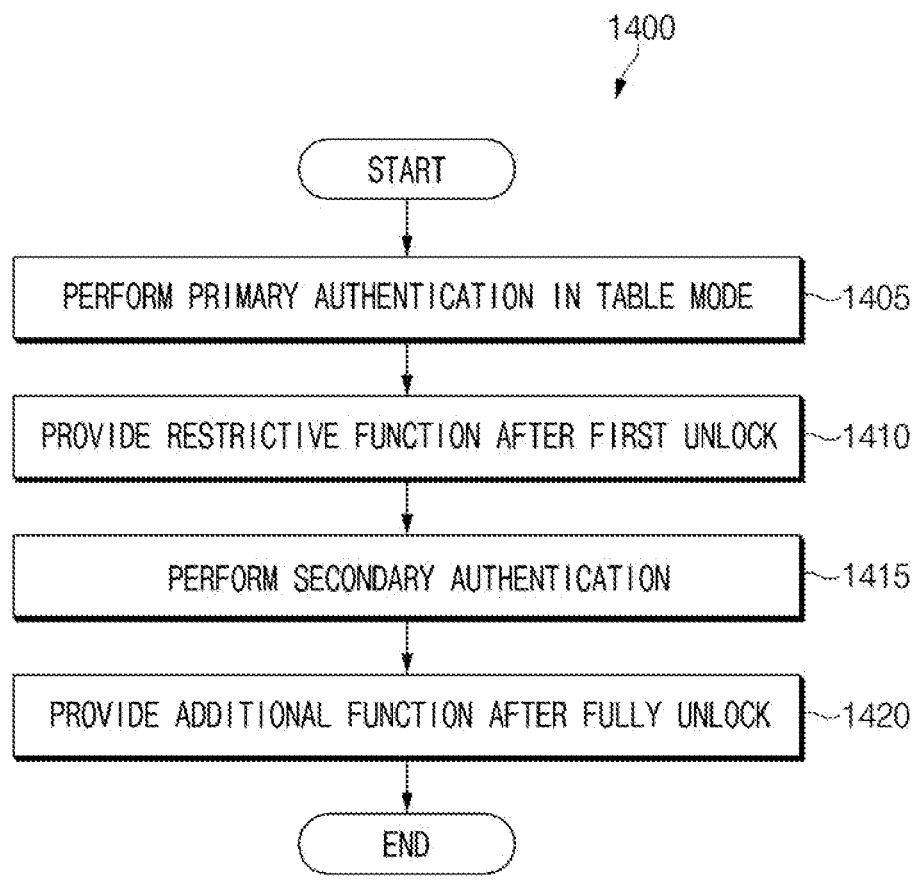
FIG. 14 illustrates an operation flowchart conceptually illustrating an authentication method executed by an electronic device, according to an embodiment; and With regard to description of drawings, the same or similar components will be marked by the same or similar reference signs.

FIG. 14 illustrates an operation flowchart conceptually illustrating an authentication process 1400 executed by an electronic device, according to various embodiments.

According to an embodiment, in operation 1405, an electronic device (e.g., the electronic device 101 of FIG. 1) may perform primary authentication in a table mode (e.g., the table mode 602 of FIG. 6A) while being folded at a specified angle. For example, the primary authentication may be face recognition (e.g., determining whether a face is present). When providing a user authentication function in the table mode 602, the electronic device 101 may apply an authentication algorithm different from other operating modes (e.g., a mobile mode and/or a tablet mode). For example, in the table mode 602, the electronic device 101 may have a relatively long distance from a user compared to other modes, and the electronic device 101 may therefore apply an authentication algorithm for increasing an allowable range (e.g., a distance between the electronic device and the user or an angle of a face) of face recognition. When the primary authentication is successful, the electronic device 101 may perform operation 1410.

In operation 1410, the electronic device 101 may restrictively provide a function after performing a first unlock. For example, when an event is received by the electronic device, the electronic device may restrict at least part of the content corresponding to the event and may display the restricted content on the display. As another example, the content of the event received from an application having a specified security level or higher may be restrictively displayed by setting different security levels for each application. In embodiments, the security level of an application that requires personal information may be set to be high when running. The security level may be specified by the user's setting.

In operation 1415, the electronic device 101 may perform secondary authentication. For example, the secondary authentication may be facial recognition-based biometric authentication. In this case, when the biometric authentication fails, the electronic device 101 may provide a user interface including a guide for the success of biometric authentication on the display. After providing the user interface, the electronic device 101 may perform the secondary authentication again depending on detecting the user's face composition change using an image sensor or detecting device movement using an acceleration sensor. When the secondary authentication is successful, the electronic device 101 may perform operation 1420.

In operation 1420, the electronic device 101 may provide an additional function in a fully unlocked state. For example, content, which has restricted to be displayed after the first unlock, from among the content corresponding to the received event may be displayed on the display. As another example, information including the content of the event received from an application having a specified security level or higher may be displayed.

What is claimed is:

1. A foldable electronic device comprising:
   a first housing and a second housing that are foldable with respect to each other;
   at least one sensor;
   a display;
   a camera configured to operate in a first mode associated with user recognition, and a second mode associated with user authentication;
   a memory storing instructions;
   at least one processor configured to execute the instructions to:

control the display to display notification information about an event corresponding to the foldable electronic device;

based on a folding state of the foldable electronic device detected using the at least one sensor satisfying a predetermined condition, obtain at least one first image using the camera operating in the first mode;

identify whether a face is present in the at least one first image;

based on identifying that the face is present in the at least one first image, obtain at least one second image using the camera operating in the second mode;

perform face recognition-based biometric authentication using at least part of the at least one second image; and based on the biometric authentication being successful, control the display to display content corresponding to the event.

2. The foldable electronic device of claim 1, wherein the processor is further configured to execute the instructions to:
based on an operating time of the camera exceeding a predetermined time in the first mode, terminate an operation of the camera and deactivate the display.

3. The foldable electronic device of claim 1, wherein the processor is further configured to execute the instructions to:
based on a plurality of faces being present in the at least one first image, control the display to continuously display the notification information about the event without performing the biometric authentication.

4. The foldable electronic device of claim 3, wherein the processor is further configured to execute the instructions to:
extract a location of a face of a user associated with the foldable electronic device from among the plurality of faces included in the at least one first image; and
control the display to display the notification information about the event in a region corresponding to the location.

5. The foldable electronic device of claim 1, wherein the processor is further configured to execute the instructions to:
based on the biometric authentication being not successful, display a user interface which provides a guide for the biometric authentication on the display.

6. The foldable electronic device of claim 5, wherein the processor is further configured to execute the instructions to:
control the display to display the user interface; and
perform the biometric authentication again based on detecting at least one from among a face composition change of a user using the at least one sensor, or a device movement.

7. The foldable electronic device of claim 1, wherein the processor is further configured to execute the instructions to:
perform the biometric authentication by reading out only a partial region of the at least one second image.

8. The foldable electronic device of claim 1, wherein the predetermined condition comprises a first predetermined condition, and
wherein the processor is further configured to execute the instructions to select a face recognition algorithm for performing the biometric authentication based on whether the folding state of the foldable electronic device detected using the at least one sensor satisfies a second predetermined condition.

9. The foldable electronic device of claim 1, wherein the processor is further configured to execute the instructions to:
based on identifying that the face is present in the at least one first image, control the display to display at least part of the content corresponding to the event.

10. The foldable electronic device of claim 9, wherein the processor is further configured to execute the instructions to:
based on the biometric authentication being successful, control the display to display additional content, from among the content corresponding to the event, in addition to the at least part of the content.

11. The foldable electronic device of claim 1, wherein a power consumption corresponding to the second mode is higher than a power consumption corresponding to the first mode.

12. A method of providing a notification function using a foldable electronic device, the method comprising:
displaying notification information about an event corresponding to the foldable electronic device on a display of the foldable electronic device;
determining whether a folding state of the foldable electronic device detected using at least one sensor satisfies a predetermined condition;
based on the predetermined condition being satisfied, obtaining at least one first image using a camera of the foldable electronic device in a first mode associated with user recognition;
identifying whether a face is present in the at least one first image;
based on identifying that the face is present in the at least one first image, obtaining at least one second image using the camera in a second mode corresponding to user authentication;
performing face recognition-based biometric authentication using at least part of the at least one second image; and
based on the biometric authentication being successful, displaying content corresponding to the event on the display.

13. The method of claim 12, wherein the obtaining the at least one first image comprises:
based on an operating time of the camera exceeding a predetermined time in the first mode, terminating an operation of the camera and deactivating the display.

14. The method of claim 12, wherein the identifying whether the face is present in the at least one first image comprises:
based on identifying that a plurality of faces are present in the at least one first image,
continuously displaying the notification information about the event on the display without performing the biometric authentication.

15. The method of claim 14, wherein the identifying whether the face is present in the at least one first image further comprises:
extracting a location of a face of a user associated with the foldable electronic device, from among the plurality of faces included in the at least one first image; and
displaying the notification information about the event in a region corresponding to the location on the display.

* * * * *